United States Patent [19]

Collins, Jr.

[11] Patent Number: 5,444,226

[45] Date of Patent: Aug. 22, 1995

[54] REAL-TIME BARCODE SCANNING PERFORMANCE FEEDBACK SYSTEM

[75] Inventor: Donald A. Collins, Jr., Duluth, Ga.

[73] Assignee: AT&T Global Information Solutions Company, Dayton, Ohio

[21] Appl. No.: 60,664

[22] Filed: May 13, 1993

[51] Int. Cl.6 .............................................. G06K 7/10
[52] U.S. Cl. .................... 235/462; 235/383
[58] Field of Search ............... 235/462, 383, 472; 186/61; 434/337, 358, 331

[56] References Cited

U.S. PATENT DOCUMENTS

| | | | |
|---|---|---|---|
| 4,493,038 | 1/1985 | Bovio et al. | 364/405 |
| 4,768,209 | 8/1988 | Yu | 377/6 |
| 4,959,871 | 9/1990 | Mori et al. | 235/472 X |
| 5,231,293 | 7/1993 | Langacre, Jr. | 235/472 X |

*Primary Examiner*—John Shepperd
*Attorney, Agent, or Firm*—Paul W. Martin

[57] ABSTRACT

A feedback system for an optical scanner which provides scanning rate information to an operator during scanning. The feedback system includes a controller for determining scanning rate information during scanning, and a plurality of lights controlled by the controller which provide the scanning rate information to an operator during scanning. The system also includes a shift register coupled between the controller and the indicator lights, and a speaker for providing an aural indication of successful and unsuccessful scanning events during scanning. The number of lights turned on during scanning is directly related to the scanning rate. The indicator lights may also provide information about the maximum scanning rate. The indicator lights are preferably arranged in a line on a side of the scanning window opposite the operator, but could be located anywhere on or in the vicinity of the scanner.

17 Claims, 1 Drawing Sheet

REAL-TIME BARCODE SCANNING PERFORMANCE FEEDBACK SYSTEM

BACKGROUND OF THE INVENTION

The present invention relates to optical scanners, and more specifically to a real-time barcode scanning performance feedback system.

Many retailers use point-of-service (POS) systems to measure the scanning performance of their checkout personnel, which is typically measured in items scanned per minute. Normally, each user extracts this information from the POS terminal at the end of each transaction by reading the "scanning performance" entry printed in the register receipt and stored by the back office computer system for the purpose of rating checkout personnel. This historical information is the only feedback available to checkout personnel.

Therefore, it would be desirable to provide a system which can provide real time scanning performance feedback to a checkout person.

SUMMARY OF THE INVENTION

In accordance with the teachings of the present invention, a real-time barcode scanning performance feedback system is provided. The feedback system includes a controller for determining scanning rate information during scanning, and a plurality of lights controlled by the controller which provide the scanning rate information to an operator during scanning. The system also includes a shift register coupled between the controller and the indicator lights, and a speaker for providing an aural indication of successful and unsuccessful scanning events during scanning. The number of lights turned on during scanning is directly related to the scanning rate. The indicator lights may also provide information about the maximum scanning rate. The indicator lights are preferably arranged in a line on a side of the scanning window opposite the operator.

It is accordingly an object of the present invention to provide a real-time barcode scanning performance feedback system.

It is another object of the present invention to provide a real-time barcode scanning performance feedback system which provides visible or audible feedback to allow a checkout person to modify scanning performance while scanning.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
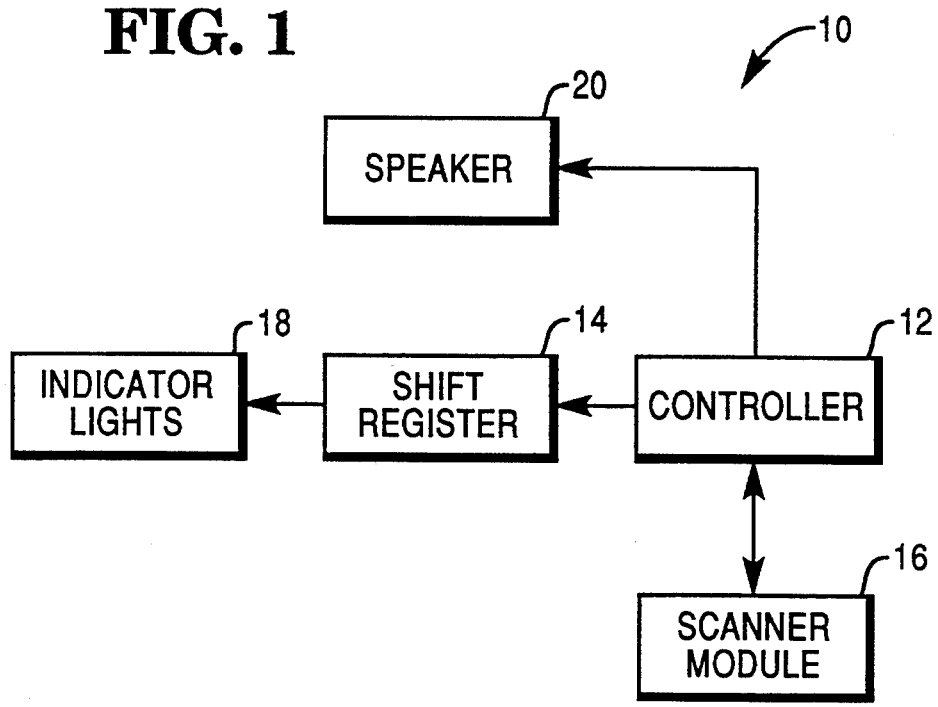
FIG. 1 is a block diagram of a scanner incorporating the feedback system of the present invention.

Referring now to FIG. 1, system 10 includes controller 12, shift register 14, scanner module 16, indicator lights 18, and speaker 20.

Controller 12 controls system 10 and processes information from the scanner to derive item identification and price information. Controller 12 also determines scanner performance information and provides feedback signals for controlling indicator lights 18 and speaker 20.

Shift register 14 is employed to drive indicator lights 18. Shift register 14 is loaded by controller 12.

Scanner module 16 includes a laser and mirrors for producing scanning beams and for sensing the information contained within bar codes.

Indicator lights 18 provide visual feedback information to an operator.

Speaker 20 provides aural feedback information to an operator.

Figure 2:
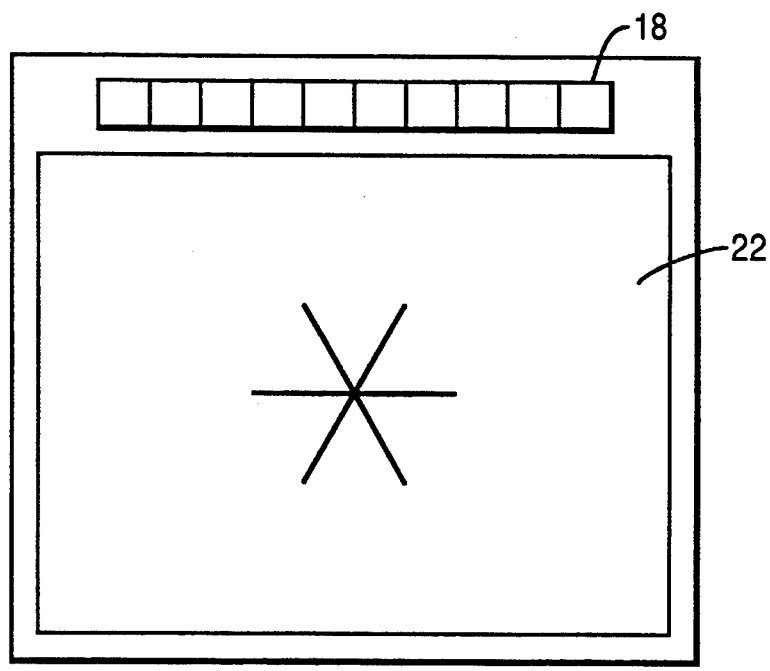
FIG. 2 is a top view of a scanner window incorporating the feedback system of the present invention.

Turning now to FIG. 2, indicator lights 18 are preferably located on the side of scanner window 22 opposite the operator. Preferably ten lights are employed. When mounted in this position, indicator lights 18 are not obstructed by the hand or arm of the operator.

In operation, controller 12 measures the time in between each valid scanning of merchandise items and computes the rate of scanning merchandise items. The rate information is displayed by indicator lights 18, with the number of lights turned on from one to ten being directly related to the scanning rate. As the operator's scanning rate increases, more of the lights from left to light are turned on. When the scanner is in an idle mode, the first indicator light is preferably illuminated.

Alternatively, bicolor light emitting diodes (LEDs) may be employed. When mounted in an optical diffuser, they have the appearance of an analog light bar display.

Preferably, system 10 may be programmed for two skill levels: high performance and low performance. Each level has a different light persistence value (the time that each of the indicator lights remains turned on).

In the high performance mode, whenever a good scan occurs, the first indicator light is turned on (green for bicolor LEDs) and an audible tone is sounded over speaker 20. For each successive scan, the audible tone is sounded and at least the first indicator light is turned on. The remaining indicator lights 18 are turned on as a function of the scanning speed which is achieved by the operator.

In the low performance mode, whenever a good scan occurs, the first and second indicator light are turned on (red for bicolor LEDs) and an audible tone is sounded over speaker 20. For each successive scan, the audible tone is sounded and at least the first and second indicator lights are turned on. The remaining indicator lights 18 are turned on as a function of the scanning speed which is achieved by the operator.

Indicator lights 18 may be programmed so that the first indicator light is on the right or the left side of scanner window 22. System 10 may also be programmed to retain in memory and display the highest scanning speed after a transaction is completed.

Although the present invention has been described with particular reference to certain preferred embodiments thereof, variations and modifications of the present invention can be effected within the spirit and scope of the following claims.

What is claimed is:

1. An optical scanner comprising:
    a scanner module which produces scanning light beams and which collects light reflected from a barcode;
    a controller coupled to the scanner module for processing barcode information from the scanner module and for determining a speed of an operator defined as a number of bar code labels on articles held by the operator which are successfully scanned by the scanner module per unit time; and a scanning performance feedback system coupled to the controller which indicates the speed to the operator during scanning.

2. The optical scanner as recited in claim 1, wherein the feedback system comprises:

a plurality of lights controlled by the controller wherein the number of lights turned on during scanning is directly related to the speed.

3. The optical scanner as recited in claim 2, wherein the scanner further comprises a scanner window through which the scanning light beams are emitted and wherein the lights are arranged in a line on a side of the scanner window.

4. The optical scanner as recited in claim 3, wherein the side of the scanner window where the lights are arranged is opposite the operator.

5. The optical scanner as recited in claim 3, wherein the indicator lights are light emitting diodes.

6. The optical scanner as recited in claim 5, wherein the light emitting diodes are bicolor light emitting diodes.

7. The optical scanner as recited in claim 2, wherein the feedback system further comprises:

a shift register coupled between the controller and the indicator lights.

8. The optical scanner as recited in claim 2, further comprising:

a speaker coupled to the controller for providing aural feedback to the operator during each successful and unsuccessful scanning event.

9. A feedback system for an operator of an optical scanner comprising:

a controller for determining a speed of the operator during scanning defined as a number of bar code labels on articles held by the operator which are successfully scanned by the scanner per unit time; and a plurality of lights controlled by the controller which indicate the speed to the operator during scanning.

10. The feedback system as recited in claim 9, wherein the number of lights turned on during scanning is directly related to the speed.

11. The feedback system as recited in claim 10, further comprising:

a shift register coupled between the controller and the indicator lights.

12. The feedback system as recited in claim 10, wherein the scanner has a scanner window through which scanning light beams are emitted, and wherein the lights are arranged in a line on a side of the scanner window.

13. The feedback system as recited in claim 12, wherein the side where the lights are arranged is opposite the operator.

14. The feedback system as recited in claim 9, wherein the lights also provide information about a maximum speed during a transaction.

15. A method for measuring the speed of an operator using a scanner during a transaction comprising the steps of:

scanning a number of bar code labels on articles held by the operator by the scanner;

determining a time necessary to successfully scan the number of bar code labels on articles held by the operator by the scanner;

determining the speed of the operator by dividing the number of bar code labels by the determined time; and providing an indication to the operator during the transaction of the speed.

16. The method as recited in claim 15, in which the indication is visual.

17. The method as recited in claim 16, in which the indication is aural.

* * * * *